(12) United States Patent
Maier et al.

(10) Patent No.: US 8,455,067 B2
(45) Date of Patent: Jun. 4, 2013

(54) COMPENSATION ELEMENT FOR JOINING COMPONENTS

(75) Inventors: Fabian Maier, Westheim (DE); Rigo Lichtblau, Mannheim (DE)

(73) Assignee: Friatec Aktiengesellschaft, Mannheim (DE)

( * ) Notice: Subject to any disclaimer, the term of this patent is extended or adjusted under 35 U.S.C. 154(b) by 449 days.

(21) Appl. No.: 12/450,359

(22) PCT Filed: Mar. 8, 2008

(86) PCT No.: PCT/EP2008/001870
§ 371 (c)(1),
(2), (4) Date: Jan. 5, 2010

(87) PCT Pub. No.: WO2008/113488
PCT Pub. Date: Sep. 25, 2008

(65) Prior Publication Data
US 2010/0101718 A1 Apr. 29, 2010

(30) Foreign Application Priority Data
Mar. 21, 2007 (DE) .................. 10 2007 014 049

(51) Int. Cl.
*B29C 65/02* (2006.01)
*B32B 1/08* (2006.01)
(52) U.S. Cl.
USPC ....................... 428/34.1; 156/272.2
(58) Field of Classification Search
USPC .......... 156/272.2, 279.9, 274.2, 379.6, 380.2, 156/293, 294; 428/34.1; 285/41, 114
See application file for complete search history.

(56) References Cited

U.S. PATENT DOCUMENTS

| 3,061,503 A | 10/1962 | Gould et al. |
| 4,387,845 A * | 6/1983 | Mefferd .................. 228/222 |
| 4,436,988 A | 3/1984 | Blumenkranz et al. |
| 4,695,335 A * | 9/1987 | Lyall ........................ 156/64 |
| 4,836,586 A * | 6/1989 | Martin .................. 285/381.3 |
| 5,752,725 A * | 5/1998 | El-Sobky .............. 285/21.1 |
| 6,925,152 B2 * | 8/2005 | Steinlage et al. ......... 378/144 |
| 2003/0168853 A1 * | 9/2003 | Mueller et al. ........ 285/288.11 |

FOREIGN PATENT DOCUMENTS

| DE | 1 081 288 A | 5/1960 |
| DE | 2 419 893 A1 | 11/1974 |
| DE | 3422074 A1 | 1/1986 |
| DE | 37 20 577 A1 | 2/1988 |
| DE | 102 11 703 A1 | 9/2003 |

(Continued)

OTHER PUBLICATIONS

Machine Translation of FR 2648077 A1, Dec. 1990.*

*Primary Examiner* — Daniel McNally
(74) *Attorney, Agent, or Firm* — Marshall & Melhorn, LLC

(57) ABSTRACT

The invention relates to a compensation element for joining components made of fusible plastics, designed as a hollow cylinder, at least some sections of which are conical and having at least one heating element which when supplied with energy heats at least some regions of the inner surface or the outer surface of the compensation element or of both surfaces to produce a welded connection between the components. Said compensation element is characterized in that cuts are provided, starting from each outer edge of the hollow body, at least one section of the cuts extending up to or beyond a plane of the compensation element that guarantees flexibility. The invention also relates to methods in which a sleeve consisting of an outer sheath and at least one compensation element is used.

16 Claims, 4 Drawing Sheets

FOREIGN PATENT DOCUMENTS

| | | |
|---|---|---|
| FR | 1 416 207 | 9/1965 |
| FR | 1 416 217 | 9/1965 |
| FR | 2 648 077 A1 | 12/1990 |
| FR | 2648077 A1 * | 12/1990 |
| GB | 1 473 232 | 5/1977 |
| GB | 2 425 337 A | 10/2006 |
| JP | 6002797 A | 1/1994 |
| JP | 11270771 A | 10/1999 |
| WO | WO 98/48207 A1 | 10/1998 |
| WO | WO 99/13256 A1 | 3/1999 |
| WO | WO 99/22170 A1 | 5/1999 |
| WO | WO 02/11973 A1 | 2/2002 |

* cited by examiner

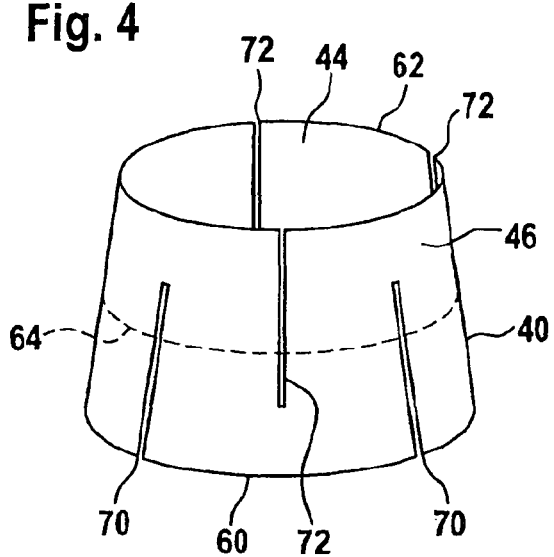
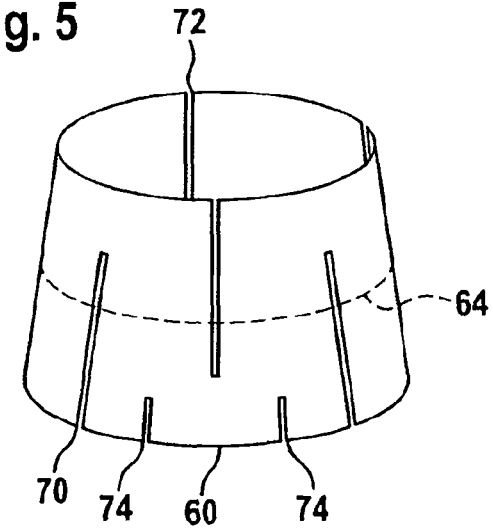
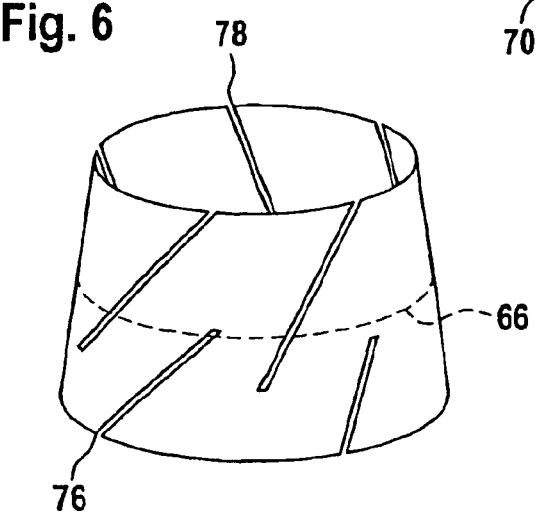

COMPENSATION ELEMENT FOR JOINING COMPONENTS

BACKGROUND OF THE INVENTION

The invention relates to a compensation element for joining components made of fusible plastics which is, at least in sections, configured as a conically shaped hollow cylinder, comprising at least one heating element which, when supplied energy, heats at least some regions of the inner surface or the outer surface of the compensation element or of both surfaces, for producing a welded joint with said components.

Such compensation elements, also referred to as heating sleeves or welding sleeves, have been known for a long time. They are mainly provided for producing inseparable joints between plastic pipes or plastic pipes and their fittings.

For example, FR-A-1 416 217 shows how two pipes may be welded by means of a conical sleeve which comprises a heating element. The pipes themselves comprise conicities mating to the conicity of the heating sleeve both on its inner side and on its outer side.

DE-A-24 19 893 discloses a pipe joint with the aid of a double sleeve, the inner sides thereof being configured in the shape of a truncated cone. The pipes to be joined are pushed into said double sleeve from its both ends and are welded together by means of a conical joining element, which is referred to as a welding joint or welding member, however, is not described in detail.

In an approach according to DE-A-34 22 074, a pipe and a sleeve are conically calibrated, similar as in FR-A-1 416 207, wherein the tolerance gap between pipe and sleeve is dimensioned according to the size of a heating sleeve which is to be inserted at a later date.

JP-B-52 066 532 also shows a conical welding sleeve, wherein a continuous slit provides that it can be modified in its radial dimension.

Another conical welding sleeve, which may be formed having perforations or as a mesh, is shown in U.S. Pat. No. 3,061,503.

A compensation element or a sleeve, respectively, of the kind set forth in the introductory is in particular known from WO 02/11973 and serves to join a pipe of a fuel line with a fuel tank. The compensation element contains said heating element both on its outer surface and its inner surface and is introduced into an angular gap between the components to be joined together, whereupon the welding occurs.

DE 10 81 288 discloses a method for joining a pipe and a sleeve by means of interposition of a wedge-shaped welding sheath. A conical outer surface of the sheath is thereby fitted into the conical inner surface of the sleeve, so that after positive sticking together of pipe, sleeve and sheath, the sheath extends some millimeters beyond the sleeve. During the welding process, the sheath is pressed into the conus of the sleeve by means of a gripper.

Such compensation elements have perfectly proven their worth for small pipe diameters. For larger pipe diameters, however, which may be absolutely in the magnitude of 1,000 mm or above, the manufacturing tolerances are so broad that gaps between components occur which complicate, if not prevent a fluid-tight welding, and this despite of the conicity of the sleeve which, also without preceding calibration of the components to be joined, provides for a certain tolerance compensation. The problem gets worse, if, for example, a pipe is irregular.

BRIEF SUMMARY OF THE INVENTION

This problem is solved by a sleeve technique which uses a compensation element having the features of claim 1. Preferred embodiments are subject matter of the reference subclaims. Methods for joining components made of fusible plastics, wherein the compensation element according to the invention are used, are subject matter of claims 11 to 14.

The compensation element of this sleeve technique is characterized in that, starting from each outer edge, cuts are made substantially in axial direction, wherein at least a portion of said cuts extends close to or beyond a plane of the compensation element that guarantees flexibility. In order to avoid that in the event of an unfavorable arrangement of the cuts a region surrounding said compensation element remains which adversely affects the flexibility of the compensation element, a plane that guarantees flexibility is defined beforehand, which comprises, as a sectional area with the compensation element, a complete circle or a complete ellipse, the surface normal thereof, therefore, being parallel to the center axis of the hollow body or forming a certain angle therewith. For manufacturing reasons, also concerning the manufacturing of said cuts, the surface normal of the plane that guarantees flexibility will run regularly parallel to the center axis of the hollow body, so that it is itself parallel to the outer edges of the hollow body. For example, the plane that guarantees flexibility may be the equatorial plane of the hollow body.

It is always essential that a part of said cuts extends at least close to or beyond the plane that guarantees flexibility. By thus purposeful guidance of the cuts in axial direction, the compensation element becomes sufficiently flexible, so that it may so-to-say travel within said pipe to close any occurring gaps. In this manner, the alleged disadvantage with respect to a standard sleeve welding process, namely dual welding, i. e. welding on both sides of the compensation element, is compensated for, so that the welding period becomes rather shortened due to the smaller gap.

Furthermore, even special pipes, such as multilayer pipes, composite pipes etc., which due to their design compensate or bridge respectively, only small gaps by thermal expansion, can easily be welded by the new sleeve technique.

According to a preferred embodiment, the cuts starting at a first outer edge are arranged offset in a circumferential direction of the compensation element with respect to cuts starting at a second outer edge, further preferred even in an alternating manner, wherein alternating a cut from said first outer edge runs to or beyond the plane that guarantees flexibility, when a cut starting from said second outer edge, again a cut starting from the first outer edge, etc.

The cuts can be arranged running vertically to the respective outer edge or running obliquely thereto. They can have a same or a different length, for example it can be provided that only every other or every third of the cuts extends from one of the outer edges beyond the plane that guarantees flexibility.

Further, the shaping of the cuts is at the most subjected to manufacturing limits. They can be linear or curved, they may comprise the same width or a varying width along their course. It has turned out that best results are achieved, if the cuts are formed having a keyhole-like contour.

Metal grids, metal strands, metal particles or metal wires are suitable as heating element, but also a layer or a conductor made of electrically conducting plastics, wherein the application of energy occurs by means of current flow or induction or microwave technology.

Preferably, the at least one heating element is a helical heating element or heating spiral, so that an established technology can be worked with. To provide a sufficient heating area, it is suitable to guide the heating spiral as a meander between the cuts. This may be done by guiding the meander in a manner that the main length of the wires extends essentially in the direction of the equatorial plane, or that the main length extends essentially perpendicularly thereto.

The heating element can thereby be formed as a bifilar element, wherein the contact terminals for supplying with energy are located close to another.

Plural heating elements can be used, which can be supplied with energy independently from another.

The compensation element is preferably used in conjunction with an outer sheath to provide for a sleeve, wherein the sleeve herein is to be understood as a component for uninterruptedly joining for example two pipes. The outer sheath is principally variable in length and can therefore be versatilely used. It can for example also serve to join a non-wound T-piece with a pipe. The outer sheath can also be configured in such a way that the sheath angles are arranged at an angle with respect to another. Further, the ends of the sheaths can, as the outer sheaths, comprise different inner diameters. For branching plural pipelines, Y- or T-shaped sheaths are possible. On the outside as well as on the inside in said outer sheath an abutment can be formed, for example in form of a ring flange, which provides that the components assume a defined position within the outer sheath. For high pressure applications, reinforcement of the outer sheath with fibers is suitable. The outer sheath and the compensation element consist themselves of fusible plastics which is compatible with fusible plastics of the component.

A method for joining components made of fusible plastics comprises the following steps:
a) providing a sleeve comprising an outer sheath and a compensation element according to one of claims 1 to 10 lying therein;
b) sliding said sleeve on a component, wherein said outer sheath and said compensation element slide oppositely in axial direction and gaps between component and compensation element as well as between compensation element and outer sheath are minimized;
c) supplying energy to the heating element of the inner surface of said compensation element, to weld said component and said compensation element together;
d) supplying energy to the heating element of the outer surface of said compensation element to weld said outer sheath and said compensation element together.

Steps c) and d) can be performed simultaneously or even interchanged.

In this method, step c) can consist of substeps
c1) supplying a first amount of energy to the heating element of the inner surface of said compensation element, to preheat said component; and
c2) supplying a second amount of energy to said heating element of the inner surface of said compensation element, to weld said component and said compensation element together.

Similarly, step d) can consist of substeps
d1) supplying a first amount of energy to the heating element of the outer surface of said compensation element, to preheat said outer sheath; and
d2) supplying a second amount of energy to the heating element of the outer surface of said compensation element, to weld said component and said compensation element together.

Thereby, the possibility exists to support the adaption of components by axially shifting the wedge-shaped compensation element by means of heat introduction, without rounding clamps being required. Furthermore, peeling the ovality, as in the prior art, having the disadvantage that the component will be weakened, is no longer required.

Another method for joining components made of fusible plastics, which may be used for repair and subsequent installation, comprises the following steps:
a) providing a sleeve comprising an outer sheath and two compensation elements according to any of claims 1 to 10 lying therein;
b) completely sliding said sleeve on a first component;
c) abutting a second component to said first component;
d) sliding said sleeve in an axial direction across the abutment site between said first component and said second component, so that one of said compensation elements overlaps said first component and the other of said compensation elements overlaps said second component;
e) simultaneously or consecutively sliding said compensation elements in an axial direction towards each other; and
f) supplying energy to the heating elements of inner surfaces and outer surfaces of said compensation elements simultaneously or consecutively, to weld said first component, said sleeve and said second component together.

"Sliding on completely" thereby means that said outer sheath together with both compensation elements are located on said first component.

If, for example, a pipeline must be repaired, the region showing a leakage can be ripped out, subsequently a respective sleeve is slid on both exposed pipe ends. A repair piece is then brought between said both pipe ends, subsequently the sleeves are slid, as described in step d), on the abutment sides of pipe ends and repair piece. Shifting of the compensation elements, so that they become wedged, can occur mechanically or hydraulically. In place of said repair piece, a T-piece or another component may be inserted.

BRIEF DESCRIPTION OF THE DRAWINGS

In the following, the invention will be explained with reference to the accompanying drawing, wherein:
FIG. 4 is a perspective view of a first embodiment of a compensation element according to the present invention;
FIG. 5 is a perspective representation of a second embodiment of a compensation element according to the present invention;
FIG. 6 is a perspective representation of a third embodiment of a compensation element according to the present invention.

DETAILED DESCRIPTION OF THE INVENTION

The drawings are schematical representations and are not necessarily drawn to scale.

Figure 1:
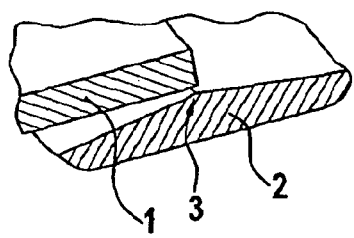
FIG. 1 shows schematically, how an assembly gap occurs when inserting pipe into a connecting piece.
Figure 2:
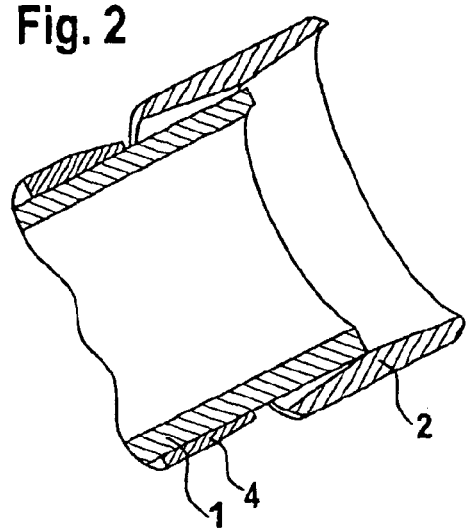
FIG. 2 shows the use of the sleeve technique.

FIG. 1 shows, highly schematically and partially cut away, a pipe 1 which is inserted into a connection piece or sleeve body 2. Due to manufacturing tolerances and assembly conditions an assembly gap 3 will typically occur between pipe 1 and connection piece 2 which must be closed to achieve at a fluid tight joint. For joining a pipe 1 with a connection piece or sleeve body 2, as it is shown in FIG. 2, firstly a conus type compensation element 4, i. e. a sliding sleeve, is slid on pipe 1, whereupon connection piece 2 is put thereon. Compensation element 4 is brought into the junction region between pipe 1 and connection piece 2 and is welded there.

Figure 3:
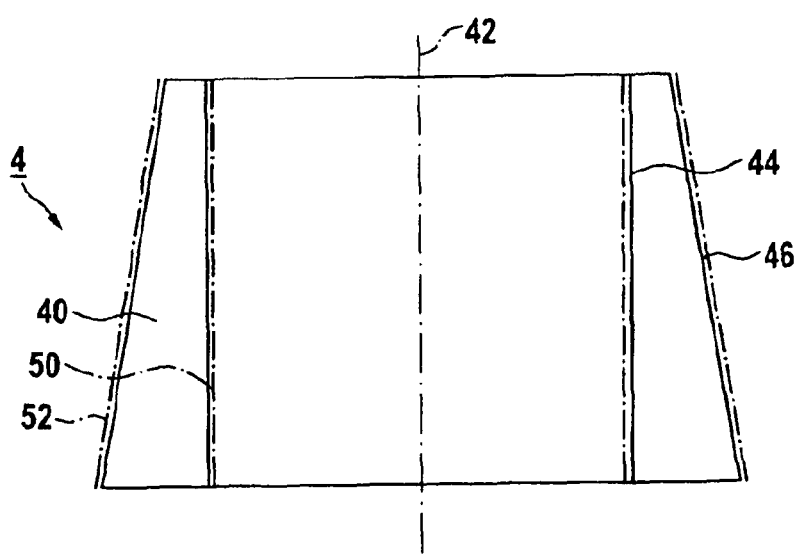
FIG. 3 is a longitudinal section view of a conical compensation element configured as a sliding sleeve.

The basic geometry of a compensation element 4 which can be used as sliding sleeve, is shown in a longitudinal section view in FIG. 3. Compensation element 4 consists of a conically shaped hollow cylinder 40 which has been axially symmetrical around its center axis 42. Inner surface 44 is in parallel to center axis 42 whereas outer surface 46 extends at a specified angle with respect to center axis 42. At least one heating element 50, 52, very schematically indicated by a dot-dash-line or a dot-double-dash-line respectively, is provided on inner surface 44 and outer surface 46, respectively, of hollow body 40. Metal grids, metal strands, metal particles or metal wires are suitable as heating element, but also a layer or a conductor made of electrically conducting plastics. Compensation element 4 can further consist of conductive plastics in its entirety. It is suitable to provide heating elements 50 or 52, respectively, for inner surface 44 and outer surface 46, which can be supplied with energy independently, however, it is also possible to provide a conducting contact between heating elements 50 and 52 to ensure that they can only be supplied with energy commonly.

Whenever in the following the terms "bottom edge" and "top edge" are discussed, these shall respectively mean the outer edges of the compensation elements, which are at the bottom or at the top, respectively, when viewing the figures of the drawings. Therefore, the bottom edge of the compensation element is the edge having the larger radius of the conically shaped hollow body, the top edge is the edge having the smaller radius.

FIG. 4 shows a compensation element according to a first embodiment of the invention. Starting at a bottom edge 60 cuts 70 are formed into the conically shaped hollow body 40, said cuts extending towards top edge 62 continuously from inner surface 44 to outer surface 46, but terminate before, wherein they extend at least beyond the equatorial plane 64, i.e. that plane bisecting the length of the hollow body and running perpendicularly to the centre axis 42 (FIG. 3). Likewise, starting from top edge 62 of hollow body 40 cuts 72 which extend towards bottom edge 60 are formed which terminate before bottom edge 60, however, again extending beyond equatorial plane 64. Both cuts 70 and cuts 72 run perpendicular to bottom edge 60 and top edge 62, respectively, of hollow body 40. Thereby, cuts 70 and 72 alternate around the circumference of hollow body 40.

While in the embodiment of FIG. 4 all cuts 70, 72 have been formed having the same length, the embodiment of FIG. 5 comprises cuts 74, which are distinctly shorter than cuts 70 and 72 and also do not extend to equatorial plane 64. These shorter cuts 74 serve to improve flexibility of the compensation element in the region of bottom edge 60 without substantially impairing its strength in total.

As already explained in the introductory, it is important that nowhere at the hollow body a closed, continuous "ring" will be produced which could hardly be deformed. The embodiments of FIGS. 4 and 5 ensure this by extending cuts 70 and 72, respectively, beyond equatorial plane 64 starting from a different direction. Under specific circumstances, for example for relatively small wall thicknesses, it can be contemplated to terminate the cuts immediately before the plane that guarantees flexibility, thereby remaining a closed "ring", which may nevertheless be deformed.

Figure 7:
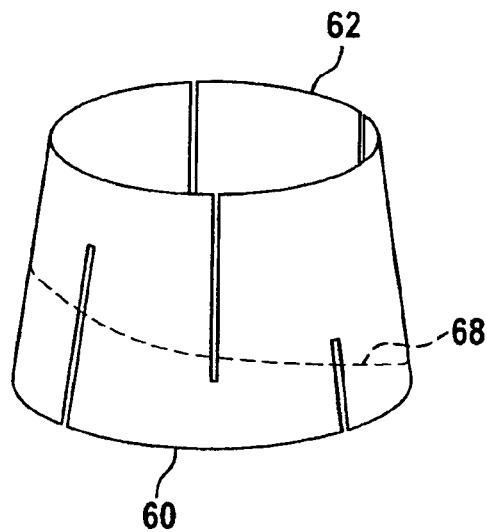
FIG. 7 is a representation of a fourth embodiment of a compensation element according to the present invention.

Another embodiment is shown in FIG. 6, wherein obliquely running cuts 76, 78 respectively extend to the opposite edge and thereby beyond the flexibility plane 66 which lies below equatorial plane 64. Such a plane needs not necessarily be perpendicular to centre axis 42 (FIG. 3) of hollow body 40, but can be inclined with respect thereto. This situation is illustrated in FIG. 7, wherein a plane 68 that guarantees flexibility and its surface normal, respectively, lie at an angle with respect to the centre axis and therefore does not run parallel to bottom edge 60 or top edge 62 of hollow body 40. This arrangement can be advantageous if in certain regions of the joint to be made between two components a particularly large welding area is necessary.

Figure 8:
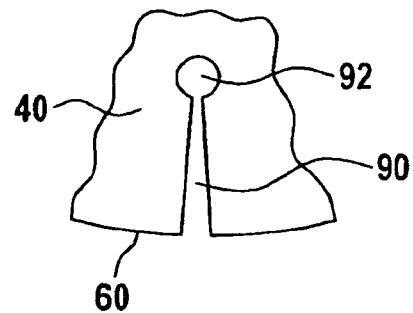
FIG. 8 is a top view of a preferred slot geometry.

In the embodiments of a compensation element according to the present invention as shown before the cuts have been illustrated as elongated slots having parallel limiting walls. Principally, different configurations of the slots are possible, they can flare to the bottom edge or to the top edge of the hollow body, comprise different widths etc. It has been proven particularly advantageous to configure a cut in the manner as shown in FIG. 8. Here the cut 90 is keyhole-like in a top view, i.e. starting from, for example, bottom edge of hollow body 40, cut 90 reduces towards the plane that guarantees flexibility and opens out into a circular cut out 92 which substantially serves to take up material which has been displaced during assembly.

Figure 9:
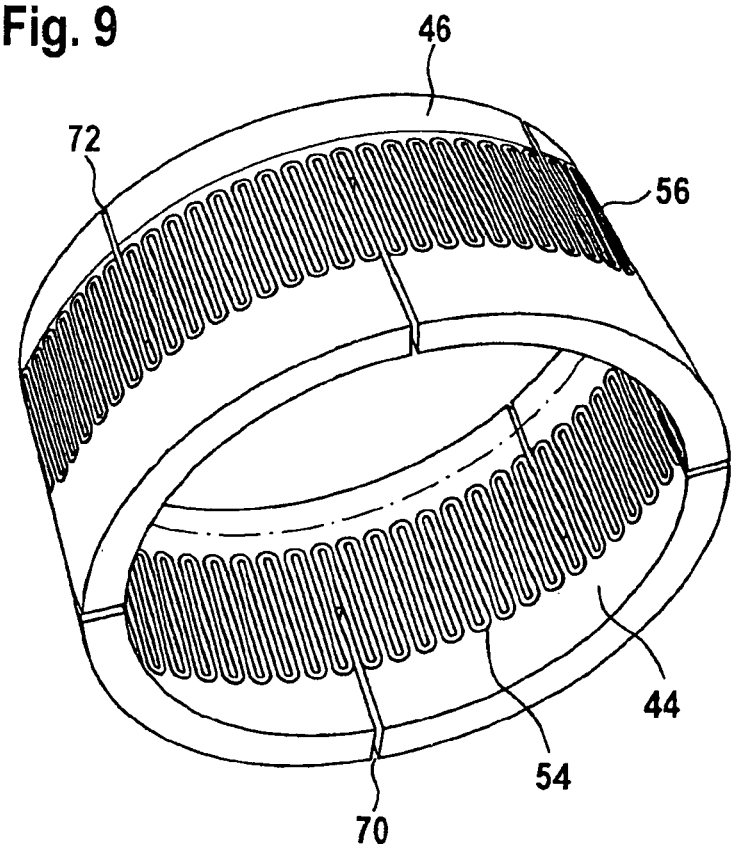
FIG. 9 is a perspective representation of a compensation element according to the present invention, wherein a heating spiral arrangement according to a first embodiment of the invention is used.

FIG. 9 shows an embodiment of a compensation element similar to FIG. 4, wherein a respective heating spiral 54 and 56, is applied to inner surface 44 and outer surface 46 and is guided meander-like around the circumference of hollow body 40. In this embodiment, the meander is guided in such a manner that the main length of the heating spiral wires extends essentially in direction of centre axis 42 (FIG. 3) or in the longitudinal direction of cuts 70, 72, respectively. This configuration has the advantage that practically the entire surface of the compensation element can be occupied by heating wire; however, it is difficult to manufacture, since the tool for inserting the heating spiral must be often guided around a reversement of 180°.

Figure 10:
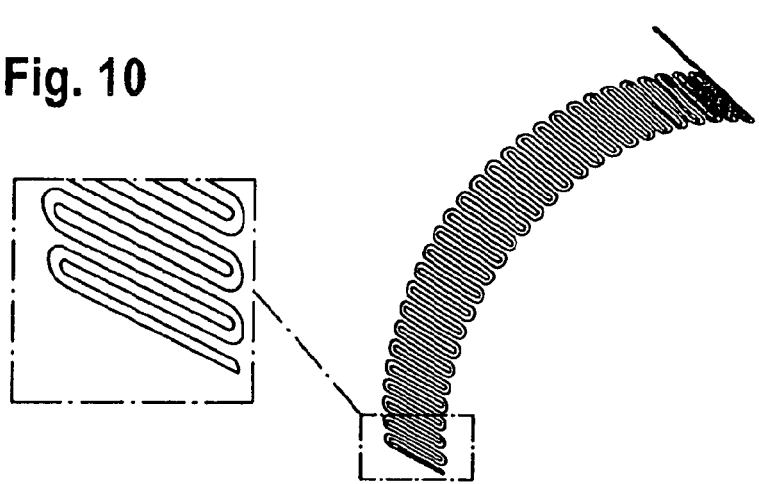
FIG. 10 is a detailed representation of the heating spiral which is used in the compensation element of FIG. 8.

FIG. 10 shows the heating spiral configured as a bifilar element wherein contact terminals for supplying energy are located closely to another.

Figure 11:
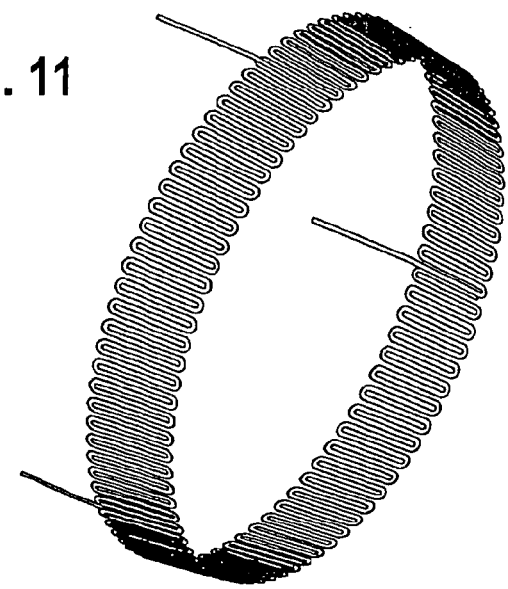
FIG. 11 shows a modular heating spiral arrangement.

This enables, as illustrated in FIG. 11, a modular construction of the heating spiral, wherein plural heating spirals may be supplied with energy and be used for welding independently from another.

Figure 12:
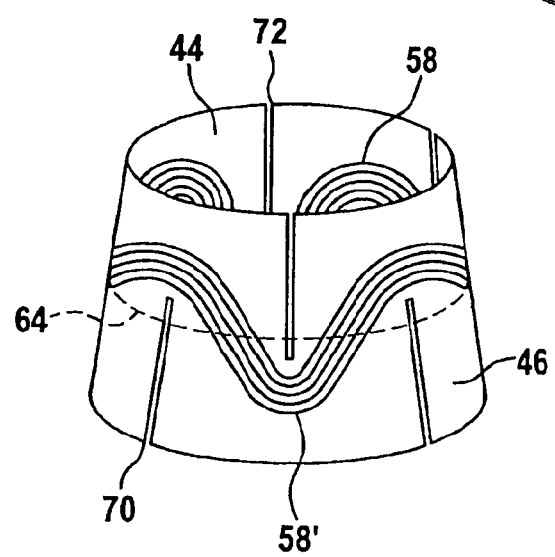
FIG. 12 shows a compensation element according to FIG. 4, wherein a heating spiral arrangement according to a second embodiment of the invention is introduced.

A further possibility to guide heating elements 58, 58' in form of heating wires meander-like between cuts 70, 72, is illustrated in FIG. 12 showing a compensation element according to FIG. 4. Here, the main length of the wire extends substantially towards equatorial plane 64. Since no reversements of 180° are provided, except for one turning loop, this kind of configuration can be accomplished easier with regard to tool engineering. The heating element on inner surface 44 of the compensation element is thereby guided congruently with the heating element on outer surface 46 of the compensation element. Indeed, there are only five equidistantly running heating wire guides shown in the drawing, it is however appreciated that in a practical realization as many wires are arranged side by side to achieve at the welding area necessary for safe welding.

The features disclosed in the foregoing description, in the claims and/or in the accompanying drawings may, both separately and in any combination thereof, be material for realising the invention in diverse forms thereof.

The invention claimed is:

1. A compensation element for joining components made of fusible plastics, which is at least in sections formed as a conically shaped hollow body, said hollow body being configured axi-symmetrically in relation to its center axis and having an inner surface, said inner surface running parallel to its center axis, and an outer surface, said outer surface lying at a specific angle in relation to said center axis, comprising at least one heating element which, when supplied with energy, heats at least some regions of the inner surface or the outer surface of said compensation element or of both surfaces to produce a welded joint with said components, wherein, starting from each outer edge of said hollow body, cuts are formed therein, wherein at least a portion of said cuts extend close to or beyond a pre-defined flexibility securing plane of said compensation element, and wherein at least a first cut starting from a first outer edge substantially in an axial direction, the cut extending continuously from the inner surface to the outer surface of said compensation element, and at least a second cut starting from a second outer edge substantially in an axial direction, the cut extending continuously from the inner surface to the outer surface of said compensation element, are provided, both cuts extending to or beyond the flexibility securing plane, wherein said flexibility securing plane contains as an intersection with the compensation element a complete circle or a complete ellipse, the surface normal thereof lying parallel to said center axis of said hollow body or at an angle thereto such that a closed circumferential ring is produced nowhere in said body, wherein said compensation element comprises fusible plastics.

2. The compensation element according to claim 1, wherein said at least one heating element is a heating spiral.

3. The compensation element of claim 2, wherein said heating spiral is guided between said cuts in a meander-like manner.

4. The compensation element of claim 1, wherein said cuts, starting from the first outer edge, are, in a circumferential direction, offset with respect to cuts starting from the second outer edge.

5. The compensation element of claim 1, wherein said cuts are perpendicular to said outer edges.

6. The compensation element of claim 1, wherein said cuts are at least partly formed with a keyhole-like contour.

7. The compensation element of claim 1, wherein metal grids, metal strands, metal particles or metal wires or a layer or a conductor made of electrically conductive plastics is provided as said heating element or that said hollow body consists of electrically conductive plastic, so that the heating element is suitable for energy supply by means of current or induction or microwave technology.

8. The compensation element of claim 1, wherein said heating element is configured as a bifilar element.

9. The compensation element of claim 1, comprising plural heating elements which may be supplied with energy independently from another.

10. The compensation element of claim 1, comprised of polyolefines.

11. The compensation element of claim 1, comprised of polyethylene and/or polypropylene.

12. The compensation element of claim 1, wherein the components made of fusible plastics to be joined are about 1000 mm or larger in diameter.

13. A method for joining components made of fusible plastics, comprising the steps of:
    a) providing a sleeve comprising an outer sheath and a compensation element according to claim 1 lying therein, wherein said compensation element comprises a heating element both on its inner surface as well as on its outer surface;
    b) sliding said sleeve on a component, wherein said outer sheath and said compensation element slide oppositely in axial direction and gaps between component and compensation element as well as between compensation element and outer sheath are minimized;
    c) supplying energy to the heating element of the inner surface of said compensation element, to weld said component and said compensation element together; and
    d) supplying energy to the heating element of the outer surface of said compensation element to weld that outer sheath and said compensation element together.

14. The method of claim 13, wherein step c) comprises the following steps:
    c1) supplying a first amount of energy to the heating element of the inner surface of said compensation element to preheat said component;
    c2) supplying a second amount of energy to the heating element of the inner surface of said compensation element to weld said component and said compensation element together.

15. The method of claim 13, wherein said step d) comprises the following steps:
    d1) supplying a first amount of energy to the heating element of the outer surface of the compensation element to preheat the outer sheath; and
    d2) supplying a second amount of energy to the heating element of the outer surface of said compensation element to weld said outer sheath and said compensation element together.

16. A method for joining components made of fusible plastics, comprising the following steps:
    a) providing a sleeve comprising an outer sheath and two compensation elements according to claim 1 lying therein, wherein each said compensation element comprises a heating element both on its inner surface as well as on its outer surface;
    b) completely sliding said sleeve on a first component;
    c) abutting a second component to said first component;
    d) sliding said sleeve in an axial direction across the abutment site between said first component and said second component, so that one of said compensation elements overlaps said first component and the other of said compensation elements overlaps said second component;
    e) sliding said compensation elements in an axial direction towards another simultaneously or consecutively; and
    f) supplying energy to the heating elements of inner surface and outer surface of said compensation element simultaneously or consecutively thereby, to weld said first component, said sleeve and the second component together.

* * * * *

UNITED STATES PATENT AND TRADEMARK OFFICE
CERTIFICATE OF CORRECTION

PATENT NO. : 8,455,067 B2
APPLICATION NO. : 12/450359
DATED : June 4, 2013
INVENTOR(S) : Maier et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 626 days.

Signed and Sealed this
Eighth Day of September, 2015

Michelle K. Lee
*Director of the United States Patent and Trademark Office*